United States Patent
Takeo et al.

(10) Patent No.: US 9,404,433 B2
(45) Date of Patent: Aug. 2, 2016

(54) CONTROL DEVICE EQUIPPED WITH MULTIPLE GROUNDS

(71) Applicant: HONDA MOTOR CO., LTD., Minato-ku, Tokyo (JP)

(72) Inventors: Nobuaki Takeo, Saitama (JP); Atsushi Kurauchi, Saitama (JP); Takashi Kato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 851 days.

(21) Appl. No.: 13/660,710

(22) Filed: Oct. 25, 2012

(65) Prior Publication Data
US 2013/0106175 A1    May 2, 2013

(30) Foreign Application Priority Data

Oct. 26, 2011    (JP) .................................. 2011-235477

(51) Int. Cl.
*B60R 16/02*    (2006.01)
*F02D 41/28*    (2006.01)

(52) U.S. Cl.
CPC ................. *F02D 41/28* (2013.01); *B60R 16/02* (2013.01); *F02D 2041/281* (2013.01); *F02D 2041/286* (2013.01)

(58) Field of Classification Search
None
See application file for complete search history.

(56) References Cited

U.S. PATENT DOCUMENTS

| 5,841,202 A * | 11/1998 | Noguchi et al. ............. 307/10.1 |
| 5,973,410 A | 10/1999 | Roozenbeek et al. |
| 2008/0093924 A1 | 4/2008 | Matsumoto et al. |

FOREIGN PATENT DOCUMENTS

| CN | 201506310 U | 6/2010 |
| JP | 64-37345 U | 3/1987 |
| JP | S64-37345 U | 3/1989 |
| JP | 2003-151794 | 5/2003 |
| JP | 2003-151794 A | 5/2003 |
| JP | 4005794 B2 | 11/2007 |
| JP | 2009-006773 A | 1/2009 |
| JP | 2009-184611 A | 8/2009 |
| JP | 2009-280129 A | 12/2009 |
| JP | 2010-132070 A | 6/2010 |
| JP | 2012114218 A * | 6/2012 |
| WO | WO 2004/016472 A1 | 2/2004 |

OTHER PUBLICATIONS

English machine translation of JP2012114218A.*
EESR issued to EPC Application No. 12190022.9, mailed May 22, 2013.

* cited by examiner

*Primary Examiner* — Rexford Barnie
*Assistant Examiner* — David Shiao
(74) *Attorney, Agent, or Firm* — Mori & Ward, LLP

(57) ABSTRACT

A control device is provided that can obtain high precision sensor outputs by way of a simple configuration without providing additional components. A control device 1 includes: an internal ground 24 and a power circuit 22, in which the internal ground 24 is divided into a high-power internal ground 241 provided inside of a housing 3 on a side of connection part 324, and a low-power internal ground 242 provided inside of the housing 3 at a position having an electrical distance from the connection part 324 that is farther than the ground 241. The ground of the control target 8 and the circuit 22 are connected to the ground 242, the ground of the sensor 6 is connected to a mounting part 325 having an electrical distance from the connection part 324 that is farther than the ground 241.

2 Claims, 4 Drawing Sheets

CONTROL DEVICE EQUIPPED WITH MULTIPLE GROUNDS

This application is based on and claims the benefit of priority from Japanese Patent Application No. 2011-235477, filed on 26 Oct. 2011, the content of which is incorporated herein by reference.

BACKGROUND OF THE INVENTION

1. Field of the Invention

The present invention relates to a control device. More specifically, the present invention relates to a control device that includes an electronic control unit which processes an electric signal from a sensor detecting a physical value, and outputs an electric signal to control a control target.

2. Related Art

For a certain control target, the electronic control unit that electrically controls this has not only the control target, but also various sensors for understanding the state of this control target, connected thereto. It goes without saying that high precision sensor outputs (physical values) are required in order to accurately understand the state of the control target and control the control target appropriately in response to this state on this occasion.

In addition, with the electronic control unit, it is not the analog sensor output itself, but rather a digital value obtained by A/D converting a differential output between the sensor output and ground that is supplied to arithmetic processing based on a control program. However, with electronic control units in an environment having a strong noise influence such as vehicles, the differential output will fluctuate if noise penetrates to the ground, and the accuracy of the A/D converted signal output will deteriorate. Therefore, various noise counter-measures have been considered (refer to Patent Documents 1 and 2).

For example, in Patent Document 1, a technology is disclosed that eliminates noise by electrically connecting an internal ground provided in a housing accommodating an electronic control unit for a vehicle, the housing and a vehicle body, and then providing a low pass filter between the electronic control unit and the power source.

In addition, Patent Document 2 discloses, as a noise counter-measure, a technology providing an electrostatic protection element between the ground for the electronic control unit and a case ground.

Patent Document 1: Japanese Unexamined Utility Model Registration Application, Publication No. S64-37345

Patent Document 2: Japanese Patent No. 4005794

SUMMARY OF THE INVENTION

However, in a case of providing extra components such as a filter and shielding element, as in these technologies of Patent Documents 1 and 2, the size of the substrate increases and the cost rises in proportion thereto.

The present invention has an object of providing a control device that can obtain high precision sensor output by way of a simple configuration without providing additional components.

In order to achieve the above-mentioned obtained, the present invention provides a control device (e.g., the control device 1 described later) including: an electronic control unit (e.g., the electronic control unit 2 described later) that processes an electric signal from a sensor (e.g., the low-power device group 6 described later) detecting a physical value, and outputs an electric signal to control a control target (e.g., the high-power device group 7 described later); and a housing (e.g., the housing 3 described later) that accommodates the electronic control unit, in which the electronic control unit includes an internal ground (e.g., the internal ground 24 described later) electrically connected to the housing and a power circuit (e.g., the regulator 22 described later) that supplies electric power for driving the sensor; the internal ground is divided into a first internal ground (e.g., the high-power internal ground 241 described later) provided inside of the housing on a side of a connection portion between the housing and a vehicle body, and a second internal ground (e.g., the low-power internal ground 242 described later) provided inside of the housing at a position having an electrical distance from the connection portion that is farther than the first internal ground, a ground of the control target is connected to the first internal ground, a ground of the power circuit is connected to the second internal ground, and a ground of the sensor is connected outside of the housing at a position (e.g., the sensor mounting part 325 of the first mounting part 312 described later) having an electrical distance from the connection portion that is farther than the first internal ground.

With the present invention, upon configuring a common ground by electrically connecting the internal ground, housing and vehicle body, among the internal grounds inside of the housing, the ground of the control target is connected to the first ground that is near the connection portion between the housing and the vehicle body, and among the internal grounds inside of the housing, the ground of the power source is connected to the second internal ground that has an electrical distance from the above-mentioned connection portion that is farther than the above-mentioned first internal ground, and the ground of the sensor driven by the electric power of this power circuit is connected outside of the housing at a position having an electrical distance from the above-mentioned connection portion that is farther than the above-mentioned first internal ground.

Herein, when comparing the first internal ground with the second internal ground and the connection portion between the ground of the sensor and the housing, since the first internal ground has a shorter electrical distance to the connection portion between the housing and the vehicle body and thus a lower impedance, more current tends to flow therethrough; whereas, the second internal ground and the connection portion between the ground of the sensor and the housing has a longer electrical distance to the connection portion between the housing and the vehicle body, and thus current hardly flows therethrough. As a result, the second internal ground and the electrical connection between the ground of the sensor and the housing all become substantially the same potential with almost no current flowing. With the present invention, in the course of arithmetic processing of the output of the sensor, it is possible to cancel the influence of the noise thereof by connecting the ground of the sensor and the ground of the power circuit driving this at such a portion that is almost the same potential. According to the present invention as described above, the influence of noise is removed by simply the connection structure of the grounds without adding additional components, whereby it is possible to obtain a sensor output of high precision.

It should be noted that, although the same effects as the abovementioned will be exerted also in the case of connecting the ground of the sensor to the second ground inside of the housing, in this case, an extra coupler pin is necessary in order to introduce the ground of the sensor into the housing. Therefore, according to the present invention, it is possible to reduce the number of coupler pins compared to a coupler introducing the ground of such sensors into the housing, and a further reduction in cost can be expected.

In this case, the control target is preferably connected to the electronic control unit via a coupler (e.g., the coupler 25 described later) provided at a position on the housing closer to the first internal ground than the second internal ground.

With the present invention, most of the current flowing from the control target outside of the housing through the coupler to the electronic control unit can be flowed to the vehicle body via the second internal ground by connecting the control target to the electronic control unit via the coupler provided at a position near the first internal ground; therefore, the influence of noise on the outputs of the sensor can be further reduced.

DETAILED DESCRIPTION OF THE INVENTION

Figure 1:
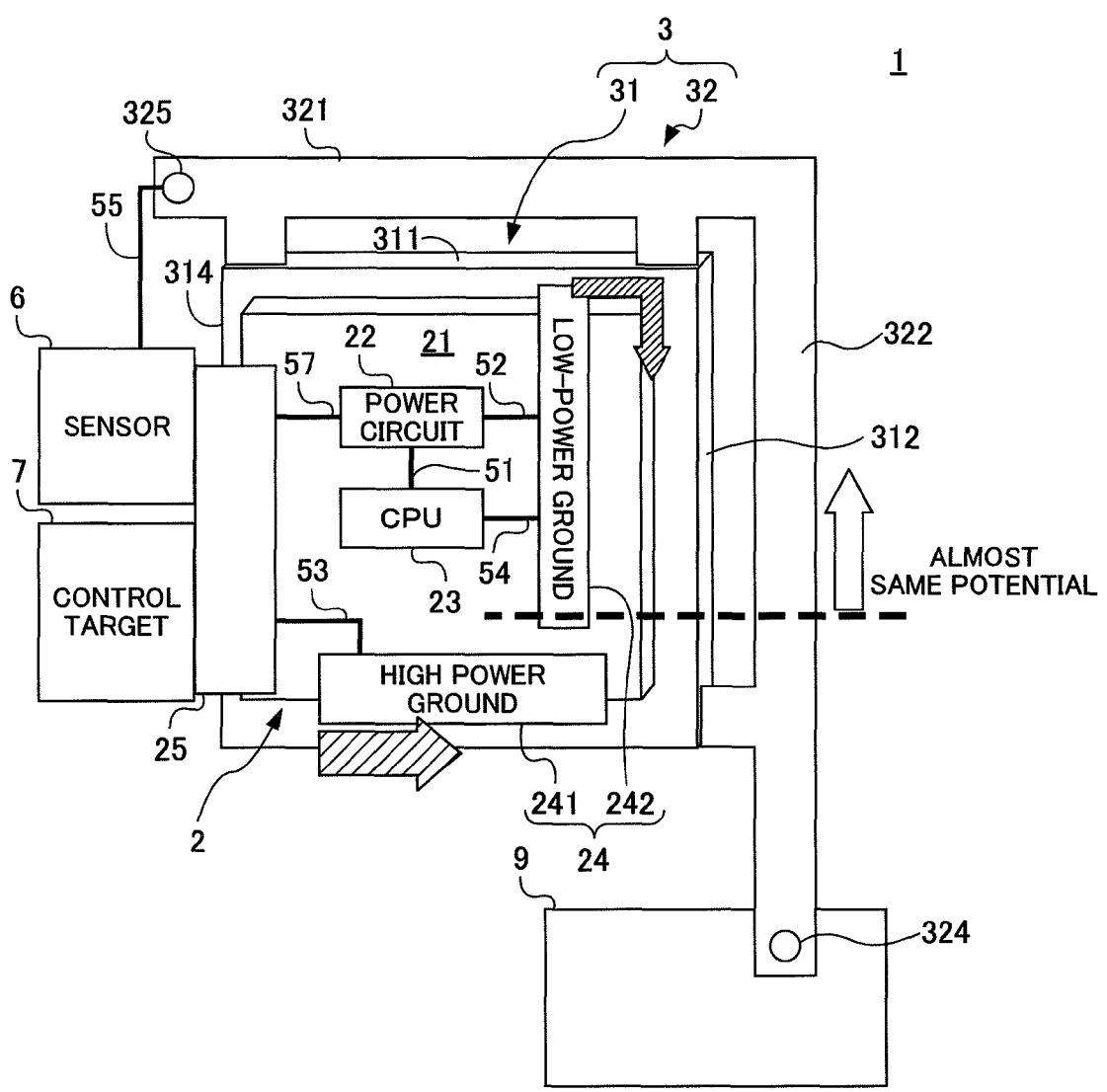
FIG. 1 is a schematic diagram showing a basic configuration of a control device for a vehicle related to an embodiment of the present invention.

FIG. 1 is a schematic diagram showing the basic configuration of a control device 1 for a vehicle related to an embodiment of the present invention.

The control device 1 is configured to include an electronic control unit 2 that processes electric signals from a sensor 6 detecting a physical value and outputs an electric signal to control a control target 7, and a housing 3 that accommodates this electronic control unit 2; and is connected to a vehicle body 9.

The housing 3 includes a box-shaped housing main body 31 accommodating the electronic control unit 2, and a mounting stay 32 that supports the housing main body 31. The mounting stay 32 includes a first mounting part 321 that extends along a lateral part 311 of the housing main body 31 at an upper part in FIG. 1, and a second mounting part 322 that extends along a lateral part 312 on the right side in FIG. 1. The housing main body 31 is integrally connected to the mounting stay 32 by way of a bolt that is not illustrated, and the mounting stay 32 is integrally connected to the vehicle body 9 at a vehicle-body connection part 324 formed at an end of the second mounting part 322 by way of a bolt that is not illustrated.

The housing main body 31 is configured by a conductive material, more specifically, a metal such as aluminum. Therefore, the housing main body 31 functions as a so-called case ground for shielding the electronic control unit 2 accommodated inside from external noise. In addition, the mounting stay 32 is also configured from a conductive material, more specifically, a metal such as aluminum. It should be noted that the housing main body 31 is electrically connected to the mounting parts 321, 322 at the two lateral parts 311, 312. In addition, the mounting stay 32 is electrically connected to the vehicle body 9 only at the vehicle-body connection part 324 formed in the second mounting part 322.

Furthermore, a coupler 25 electrically connecting the sensor 6 and control target 7 with the electronic control unit 2 is provided to a lateral part 314 of the housing main body 31 on the left side in FIG. 1.

The electronic control unit 2 is a computer configured by arranging an input/output interface, memory, etc. not illustrated, in addition to a power circuit 22 and central processing device (hereinafter referred to as "CPU") 23 on a substantially rectangular substrate 21. In addition, an internal ground 24 electrically connected to an interior surface of the housing main body 31 is provided to the substrate 21.

The power circuit 22 generates a driving voltage for driving devices such as the sensor 6 and the CPU 23, and supplies each. The sensor 6 is connected to the power circuit 22 by an electric supply line 57 through the coupler 25, and the CPU 23 is connected to the power circuit 22 by an electric supply line 51.

The CPU 23 processes a detection signal from the sensor 6 that is substantially proportional to a physical value and outputs, to the control target 7, a control signal in accordance with the detection signal from the sensor 6, based on a pre-established control program, to control this control target 7.

The internal ground 24 is divided into a high-power internal ground 241 serving as a first internal ground to which the ground of devices driven by relatively high voltage is connected, and a low-power internal ground 242 serving as a second internal ground to which the ground of devices driven by relatively low voltage is connected.

Among these, the high-power internal ground 241 is provided inside of the housing main body 31 on a side of the second mounting part 322 so as to be near the vehicle-body connection part 324, and the low-power internal ground 242 is provided inside of the housing main body 31 on a side of the first mounting part 321. In other words, these internal grounds 241, 242 are provided inside of the housing main body 31 so that the electrical distance from the vehicle-body connection part 324 to the low-power internal ground 242 is farther than the electrical distance from the vehicle-body connection part 324 to the high-power internal ground 241. In addition, as shown in FIG. 1, the high-power internal ground 241 is provided inside of the housing main body 31 so that the electrical distance to the coupler 25 is shorter than the low-power internal ground 242. These internal grounds 241, 242 are both configured from a conductive material, more specifically, plated copper.

In the control device 1 of the present embodiment, a common ground is formed by the high-power internal ground 241, low-power internal ground 242, housing main body 31, mounting stay 32 and vehicle body 9.

Here, when comparing the high-power internal ground 241 with the low-power internal ground 242 and the first mounting part 321 of the mounting stay 32, the high-power internal ground 241 has a shorter electrical distance to the vehicle-body connection part 324 of the mounting stay 32 and thus lower impedance; therefore, greater current flows from the coupler 25; whereas, the low-power internal ground 242 and the first mounting part 321 have longer electrical distances to the vehicle-body connection part 324, and thus current hardly flows from the coupler 25. Therefore, in the control device 1, a portion having an electrical distance from the vehicle-body connection part 324 farther than the high-power internal ground 241, i.e. portion above the portion illustrated by the bold dotted line in FIG. 1, becomes almost the same potential with almost no current flowing from the coupler 25.

Next, the connection structure of the grounds of various devices will be explained. The ground of the power circuit 22 is electrically connected to the low-power internal ground 242 by a GND wire 52. The ground of the control target 7 is electrically connected to the high-power internal ground 241 by a GND wire 53 through the coupler 25. The ground of the CPU 23 is electrically connected to the low-power internal ground 242 by a GND wire 54. In addition, the ground of an AC generator, which is not illustrated, is electrically connected to the vehicle body 9.

Furthermore, the ground of the sensor 6 is electrically connected by a GND wire 55 to a location outside of the housing main body 31 having an electrical distance from the vehicle-body connection part 324 farther than the high-power internal ground 241, e.g., a sensor mounting part 325 formed at an end of the first mounting part 321. As stated in the foregoing, the low-power internal ground 242 and the first mounting part 321 are considered to be about the same potential; therefore, even if connecting the ground of the sensor 6 to the sensor mounting part 325 outside of the housing main body 31, the same effect will be obtained as a case of connecting to the low-power internal ground 242.

Next, the processing to remove noise from the output of the sensor 6 in the aforementioned such control device 1 will be explained. The processing shown below is executed in the electronic control unit 2 mainly with the CPU 23.

Figure 2:
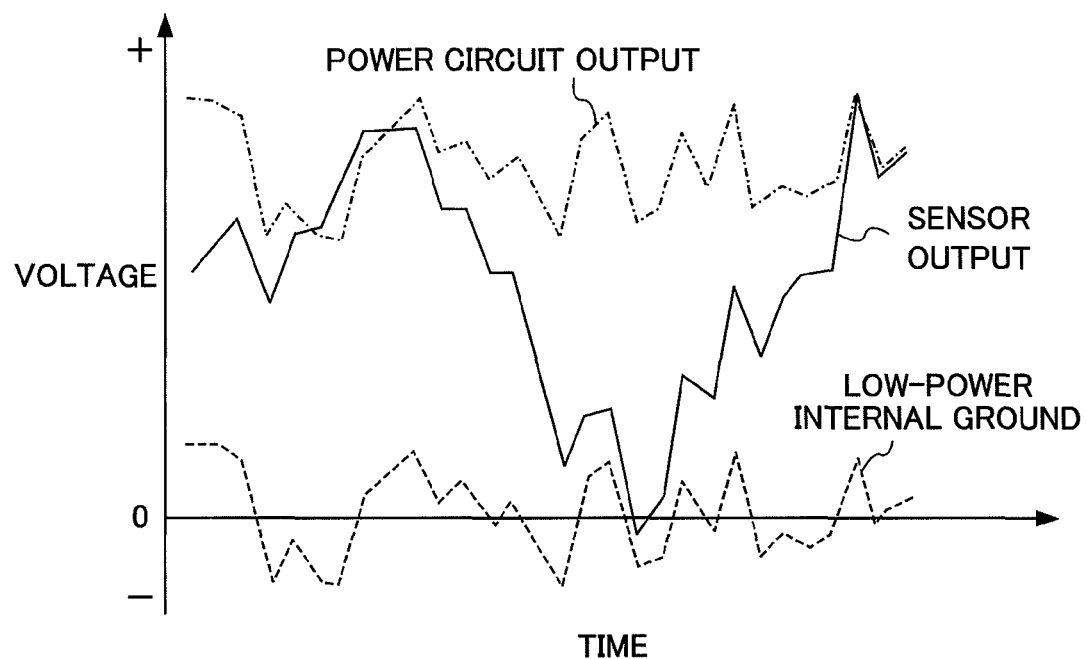
FIG. 2 is a graph showing the time changes of the voltage of a low-power internal ground, output of a power circuit, and output of a sensor.
Figure 3:
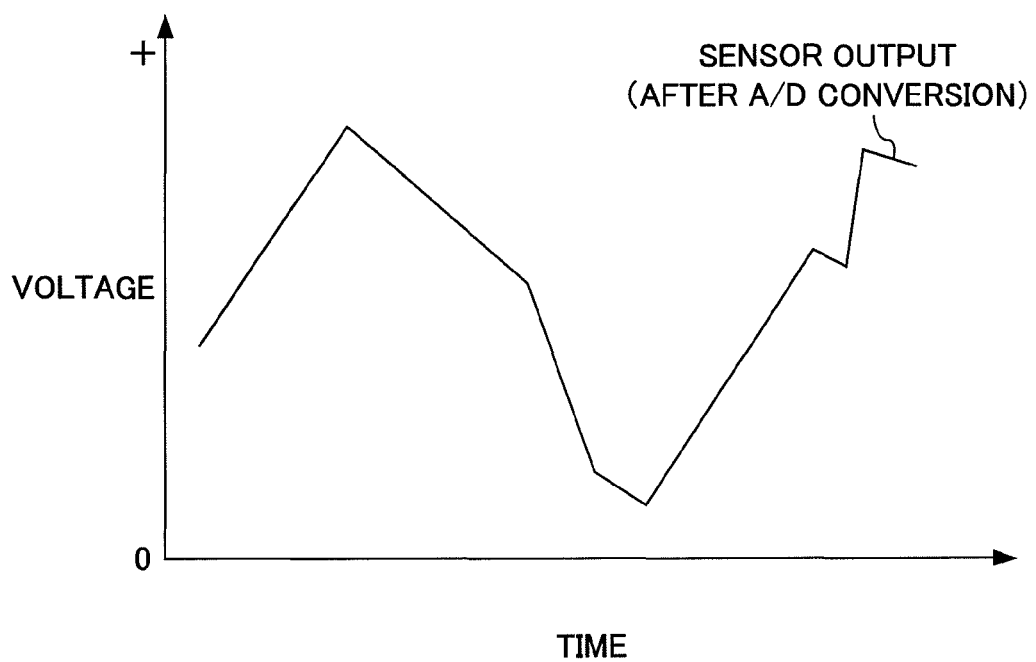
FIG. 3 is a graph showing the time change of the output of the sensor after A/D conversion in the embodiment.

FIG. 2 is a graph showing the time changes of the voltage of the low-power internal ground 242, the output voltage of the power circuit 22, and the output voltage of the sensor 6. FIG. 3 is a graph showing the time change of the output obtained by A/D converting the output voltage of the sensor 6 according to the procedure described later.

As shown in FIG. 2, the voltage of the second internal ground 252 slightly fluctuates due to the influence of noise.

Whereas, since the power circuit 22 is electrically connected to the second internal ground 252, the output of the power circuit 22 is also influenced by the noise of this second internal ground 252 and fluctuates.

On the other hand, the ground of the sensor 6 driven by the output of the power circuit 22 is electrically connected not at the second internal ground 242 to which the power circuit 22 is connected, but rather to the sensor mounting part 34 of the mount stay 32 outside of the housing; however, since the sensor mounting part 34 becomes almost the same potential as the second internal ground 252 as described in the foregoing, the output voltage of the sensor 6 is also influenced by noise similarly to the output voltage of the power circuit 22 and fluctuates.

Therefore, with the electronic control unit 2, in order to cancel the influence of noise from the output voltage of the sensor 6, a digital value obtained by A/D converting the difference between the output voltage of the sensor 6 and the voltage of the second internal ground 252 is used. It is thereby possible to obtain an output (after A/D conversion) of the sensor 6 that is high precision in which the influence of noise has been removed, as shown in FIG. 3.

Next, a more detailed configuration of the control device 1 of the embodiment will be explained while referencing FIGS. 4 and 5. It should be noted that, in the following explanation, configurations that are the same as portions explained referencing FIG. 1 or configurations made into lower-order concepts are assigned the same reference symbol, and redundant explanations will be omitted.

Figure 4:
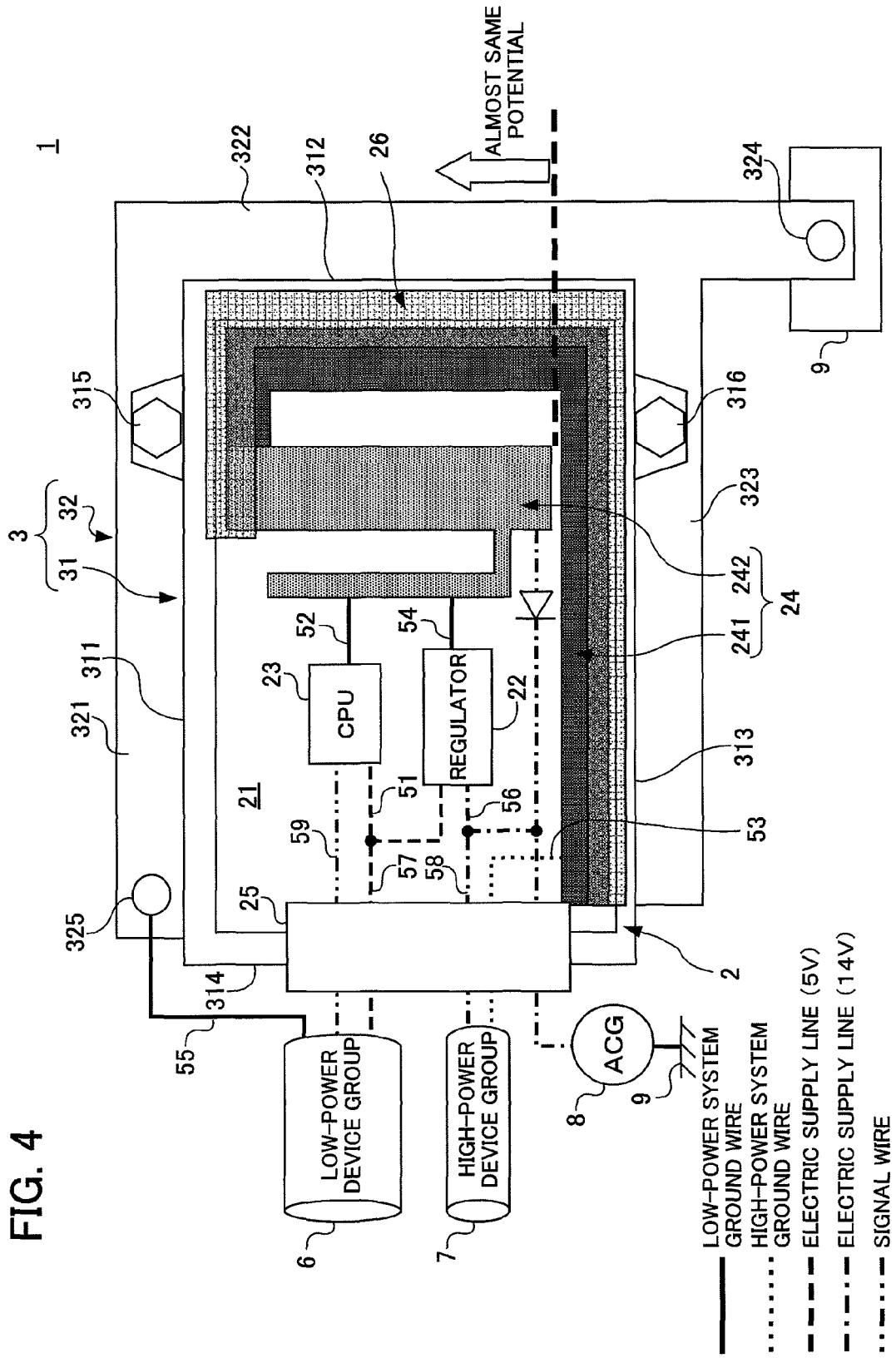
FIG. 4 is a schematic diagram showing a more detailed configuration of the control device related to the embodiment.

FIG. 4 is a schematic diagram showing a more detailed configuration of the control device 1.

As shown in FIG. 4, the mounting stay 32 includes a first mounting part 321 that extends along the lateral part 311 of the box-shaped housing main body 31 at an upper part in FIG. 4, a second mounting part 322 that extends along the lateral part 312 on the right side in FIG. 4, and a third mounting part 323 that extends along a lateral part 313 at a lower part in FIG. 4. The housing main body 31 is electrically connected at the three lateral parts 311, 312 and 313 to the mounting parts 321, 322 and 323. In addition, the housing main body 31 is fastened at the lateral parts 311, 313 to the mounting parts 321, 323 by way of bolts 315, 316.

The internal ground 24 is divided into the high-power internal ground 241 and the lower-power internal ground 242. The low-power internal ground 242 is provided along the inside of the substrate 21 in the vertical direction in FIG. 4. In contrast, the high-power internal ground 241 is provided along the periphery of the substrate 21. More specifically, the high-power internal ground 241 is provided at the periphery of the substrate 21 along the lateral parts 312, 313 of the housing main body 31, by configuring so as to surround the low-power internal ground 242 provided inside of the substrate from the sides of the second mounting part 322 and third mounting part 323, which are closer to the vehicle-body connection part 324. This high-power internal ground 241 and low-power internal ground 242 are electrically connected on the substrate 21 so that the low-power internal ground 242 is on a more electrically upstream side than the high-power internal ground 241. In addition, by assuming that the amount of heat generation becomes larger since greater current flows to the high-power internal ground 241 than the low-power internal ground 242, the wiring pattern of the high-power internal ground 241, more specifically the ratio of length to width, is designed so as to be smaller.

The internal ground 24 configured in the above way is electrically connected inside of the housing main body 31 at the periphery of the substrate 21 by way of a belt-like connecting member 26 composed of a conductive material (more specifically, plated copper).

A low-power device group 6 configured by a plurality of low power devices driven by relatively little electric power, and a high-power device group 7 configured by a plurality of high-power devices driven by relatively great electric power are electrically connected to the electronic control unit 2 via the coupler 25.

More specifically, the low-power device group 6 is configured by a plurality of sensors such as an atmospheric pressure sensor that detects the value of atmospheric pressure and a temperature sensor that detects the temperature value of the open air. Various sensors configuring the low-power device group 6 are connected to the CPU 23 by signal wires 59 via the coupler 25. Detection signals substantially proportional to physical values detected by the various sensors are transmitted to the CPU 23 via the signal wire 59.

More specifically, the high-power device group 7 is configured by various devices serving as control targets of the electronic control unit 2 such as fuel injectors and an automatic transmission. The various devices configuring the high-power device group 7 are connected to the CPU 23 by a signal wires that is not illustrated, via the coupler 25. Control signals transmitted from the CPU 23 via this signal wire are inputted to the various devices.

A regulator 22 of the CPU 23 and power circuit is provided to the substrate 21 of the electronic control unit 2.

The regulator 22 is connected to the AC generator (hereinafter referred to as "ACG") provided outside of the housing main body 31 by an electric supply line 56 via the coupler 25. The regulator 22 converts the voltage (e.g., 14 V) supplied from the ACG 8 to a predetermined voltage (e.g., 5 V). The regulator 22 is connected to the CPU 23 by an electric supply line 51, and is connected to the low-power device group 6 by an electric supply line 57 via the coupler 25. The driving voltage from the regulator 22 is supplied to the CPU 23 and the low-power device group 6 via these electric supply lines 51, 57. In addition, the high-power device group 7 is connected to the ACG 8 by an electric supply line 58 via the coupler 25. The driving voltage from the ACG 8 is supplied to the high-power device group 7 via this electric supply line 58.

Next, the connection structure of the grounds of various devices in the control device 1 configured in the above way will be explained.

The ground of the regulator 22 is electrically connected to the low-power internal ground 242 by the GND wire 52. The ground of the CPU 23 is electrically connected to the low-power internal ground 242 by the GND wire 54. The ground of the ACG 8 is electrically connected to the vehicle body 9. The ground of the high-power device group 7 is electrically connected to the high-power internal ground 241 by the GND wire 53 via the coupler 25. In addition, the grounds of each sensor configuring the low-power device group 6 are electrically connected to the sensor mounting part 325 formed at an end of the first mounting part 321, by way of the GND wire 55.

According to the control device 1 configured in the above way, most of the current from the coupler 25 flows in the control device 1 through a portion on a side of the high-power internal ground 241 that is lower impedance, i.e. on a lower side than the portion indicated by the bold dotted line in FIG. 4. In contrast, portions in the control device 1 having an electrical distance from the vehicle-body connection part 324 farther than the high-power internal ground 241, i.e. portions above the portion indicated by the bold dotted line in FIG. 4, become almost the same potential with almost no current flowing from the coupler 25.

Figure 5:
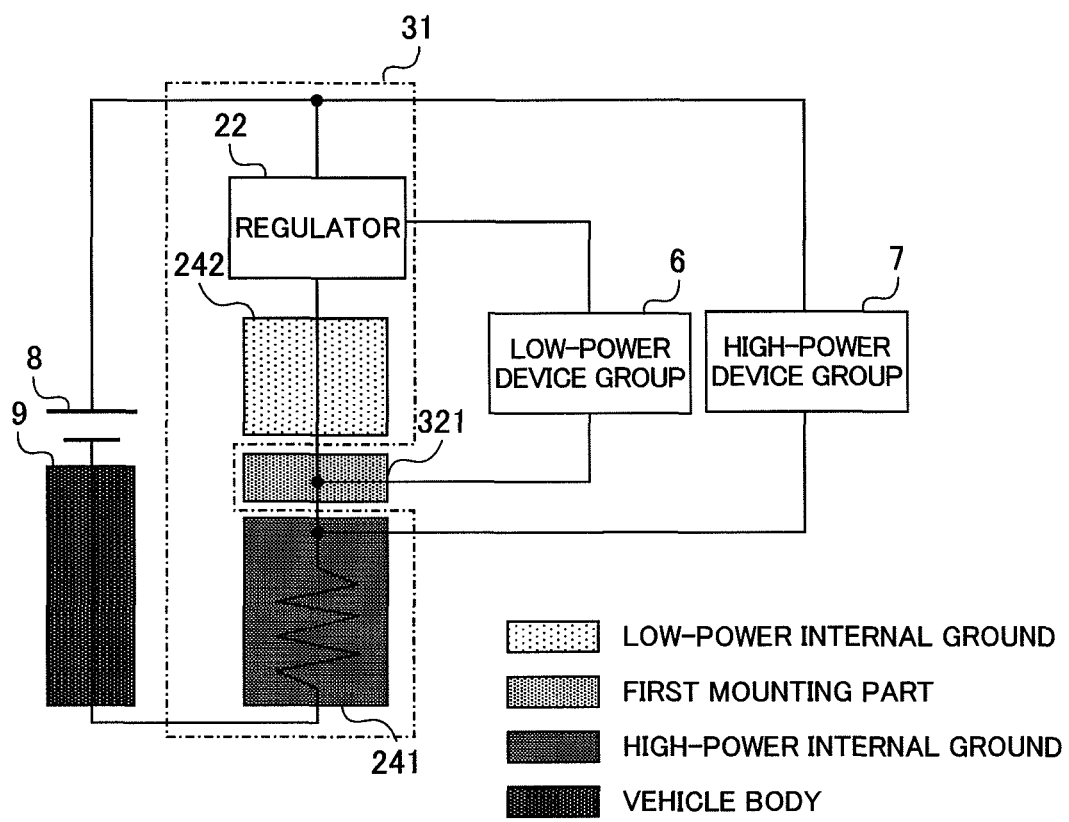
FIG. 5 is an equivalent circuit diagram of the control device related to the embodiment.

FIG. 5 is a diagram expressing the control device 1 as an equivalent circuit diagram.

As shown in FIG. 5, the regulator 22, low-power internal ground 242, first mounting part 321 of the mounting stay 32, high-power internal ground 241 and vehicle body 9 are electrically connected in this order from an upstream side to the ACG 8 connected to the vehicle body 9.

In contrast, the low-power device group 6 configured by a plurality of sensors is electrically connected to the regulator 22 and the first mounting part 321, and the high-power device group 7 serving as the control target is electrically connected to the regulator 22 and the high-power internal ground 241. Herein, although the low-power internal ground 242 to which the ground of the regulator 22 is connected in the aforementioned way and the first mounting part 321 to which the low-power device group 6 is connected are provided inside and outside of the housing main body 31, respectively, they substantially become almost the same potential. By arranging the low-power internal ground 242 on an upstream side from the high-power internal ground 241 and establishing the first mounting part 321 and the low power internal ground 242 as almost the same potential in the control device 1 in this way, it is possible to negate the influence of noise on the low-power device group 6 driven by the output of the regulator 22 and the low-power internal ground 242.

The following effects are exerted according to the control device 1 of the present embodiment.

(1) With the control device 1 of the present embodiment, by connecting the ground of the low-power device group 6 and the ground of the regulator 22 for driving this to the low-power internal ground 242 and the first mounting part 321 respectively, which become almost the same potential, it is possible to cancel the influence of noise in the course of arithmetic processing of the output of the sensors by the CPU 23, which is connected to the low power internal ground 242. According to the present invention, the influence of noise is removed by simply the connection structure of the grounds without adding additional components as described above, whereby it is possible to obtain high precision sensor output.

It should be noted that, although the same effects as the aforementioned will be exerted also in the case of connecting the ground of the low-power device group 6 to the low-power internal ground 242 inside of the housing main body 31, in this case, an extra coupler pin is necessary in order to introduce the ground of the low-power device group 6 into the housing main body 31. Therefore, according to the control device 1 of the present embodiment, it is possible to reduce the number of coupler pins compared to a coupler introducing the ground of the low-power device group 6 into the housing main body 31 by the number of sensors.

In addition, by electrically connecting the internal ground 24 to a surface on the interior of the housing main body 31, a heat conduction path through the internal ground 24 and the housing main body 31 is formed; therefore, it is possible to improve the heat dissipation from inside of the housing main body 31.

(2) In addition, by connecting the high-power device group 7 to the electronic control unit 2 via the coupler 25 provided at a position near the high-power internal ground 241, it is possible to flow most of the current flowing into the electronic control unit 2 from the high-power device group 7 outside of the housing main body 31 via the coupler 25 to the vehicle body 9 via the high-power internal ground 241; therefore, the influence of noise on the output of the low-power device group can be further reduced.

It should be noted that the present invention is not to be limited to the aforementioned embodiment, and that various modifications thereto are possible.

What is claimed is:

1. A control device equipped with multiple grounds comprising:
   an electronic control unit that processes an electric signal from a sensor detecting a physical value, and outputs an electric signal to control a control target;
   a box-shaped housing that comprises a conductive material and that accommodates the electronic control unit; and
   a mounting stay that supports the housing, that comprises a conductive material and that is electrically connected to a vehicle body at a connection portion,
   wherein the electronic control unit includes an internal ground electrically connected to the housing and a power circuit that supplies electric power for driving the sensor,
   wherein the mounting stay has a first mounting part that extends along a first lateral part of the housing and a second mounting part that extends from one end of the first mounting part along a second lateral part of the housing,
   wherein the mounting stay is mountable on the vehicle body such that the connection portion is connected to an end of the second mounting part which is distal from the one end of the first mounting part,
   wherein the housing is electrically connected to the first mounting part and the second mounting part at the first lateral part and the second lateral part respectively,
   wherein the internal ground is divided into a first internal ground provided inside of the housing on a side of the second mounting part so as to be near the connection portion, and a second internal ground provided inside of the housing on a side of the first mounting part,
   wherein the first internal ground is electrically connected via the housing to the second mounting part and the second internal ground is electrically connected via the housing to the first mounting part so that the electrical distance from the connection portion to the second internal ground is farther than the electrical distance from the connection portion to the first internal ground, wherein a ground of the control target is connected to the first internal ground, wherein a ground of the power circuit is connected to the second internal ground, and wherein a ground of the sensor is connected outside of the housing to the other end of the first mounting part at a position having an electrical distance from the connection portion that is farther than the first internal ground.

2. The control device equipped with multiple grounds according to claim 1, wherein the control target is connected to the electronic control unit via a coupler provided at a position on the housing that is closer to the first internal ground than the second internal ground.

* * * * *